United States Patent
Kamruzzaman et al.

(10) Patent No.: US 10,815,963 B2
(45) Date of Patent: *Oct. 27, 2020

(54) WIND-TURBINE ROTOR BLADE, TRAILING EDGE FOR WIND-TURBINE ROTOR BLADE TIP, METHOD FOR PRODUCING A WIND-TURBINE ROTOR BLADE, AND WIND TURBINE

(71) Applicant: WOBBEN PROPERTIES GmbH, Aurich (DE)

(72) Inventors: Mohammad Kamruzzaman, Southampton (GB); Andree Altmikus, Aurich (DE)

(73) Assignee: Wobben Properties GmbH, Aurich (DE)

( * ) Notice: Subject to any disclaimer, the term of this patent is extended or adjusted under 35 U.S.C. 154(b) by 517 days.

This patent is subject to a terminal disclaimer.

(21) Appl. No.: 15/325,946

(22) PCT Filed: Jul. 17, 2015

(86) PCT No.: PCT/EP2015/066380
§ 371 (c)(1),
(2) Date: Jan. 12, 2017

(87) PCT Pub. No.: WO2016/009032
PCT Pub. Date: Jan. 21, 2016

(65) Prior Publication Data
US 2017/0152834 A1  Jun. 1, 2017

(30) Foreign Application Priority Data
Jul. 17, 2014  (DE) .......................... 10 2014 213 930

(51) Int. Cl.
*F03D 1/06* (2006.01)

(52) U.S. Cl.
CPC ........ *F03D 1/0633* (2013.01); *F05B 2260/96* (2013.01); *Y02E 10/721* (2013.01)

(58) Field of Classification Search
CPC .... F03D 7/0228; F03D 1/0633; F03D 1/0675; F03D 7/0296
See application file for complete search history.

(56) References Cited

U.S. PATENT DOCUMENTS

| | | |
|---|---|---|
| 5,088,665 A | 2/1992 | Vijgen et al. |
| 5,533,865 A | 7/1996 | Dassen et al. |

(Continued)

FOREIGN PATENT DOCUMENTS

| | | |
|---|---|---|
| CN | 1918386 A | 2/2007 |
| CN | 101498276 A | 8/2009 |

(Continued)

OTHER PUBLICATIONS

Bulder et al., "Theory and User Manual BLADOPT," ECN-C-01-011, Energy Research Centre of the Netherlands ECN, Aug. 2001, 98 pages.

(Continued)

*Primary Examiner* — J. Todd Newton
*Assistant Examiner* — John S Hunter, Jr.
(74) *Attorney, Agent, or Firm* — Seed Intellectual Property Law Group LLP

(57) ABSTRACT

A trailing edge for a rotor blade tip of an aerodynamic rotor of a wind turbine. The trailing edge comprises a trailing edge delimiting line, which replicates the contour of the trailing edge, and multiple serrations to improve flow behavior at the trailing edge. The serrations are provided at the trailing edge in dependence on the trailing edge delimiting line, and consequently on geometrical and operating parameters.

13 Claims, 9 Drawing Sheets

(56) References Cited

U.S. PATENT DOCUMENTS

| | | |
|---|---|---|
| 5,603,607 A | 2/1997 | Kondo et al. |
| 7,059,833 B2 | 6/2006 | Stiesdal et al. |
| 2003/0175121 A1 | 9/2003 | Shibata et al. |
| 2009/0007458 A1 | 1/2009 | Seiler |
| 2009/0074585 A1 | 3/2009 | Koegler et al. |
| 2009/0324416 A1 | 12/2009 | Bonnet |
| 2011/0142666 A1 | 6/2011 | Drobietz et al. |
| 2013/0149162 A1 | 6/2013 | Smith et al. |
| 2013/0280085 A1* | 10/2013 | Koegler ............... F03D 1/0633 416/228 |
| 2014/0227101 A1 | 8/2014 | Yao |
| 2015/0316029 A1 | 11/2015 | Altmikus et al. |
| 2016/0177919 A1 | 6/2016 | Van Garrel et al. |

FOREIGN PATENT DOCUMENTS

| | | |
|---|---|---|
| CN | 102465828 A | 5/2012 |
| DE | 102008037368 A1 | 4/2009 |
| DE | 102011055327 A1 | 5/2012 |
| DE | 102011050661 A1 | 11/2012 |
| EP | 0652367 A1 | 5/1995 |
| EP | 1314885 B1 | 8/2007 |
| EP | 2527642 A2 | 11/2012 |
| JP | 2000120524 A | 4/2000 |
| JP | 2003336572 A | 11/2003 |
| SU | 2694 A1 | 4/1927 |
| SU | 1740767 A1 | 6/1992 |
| UA | 54439 U | 11/2010 |
| WO | 2012156359 A1 | 11/2012 |
| WO | 2014086919 A1 | 6/2014 |
| WO | 2015016704 A1 | 2/2015 |
| WO | 2016009037 A1 | 1/2016 |

OTHER PUBLICATIONS

Corcos, "The structure of the turbulent pressure field in boundary-layer flows," *Fluid Mechanics* 18(Part 3):353-378, 1964. (28 pages).

Howe, *Acoustics of Fluid-Structure Interactions*, Cambridge University Press, Cambridge, United Kingdom, 1998, 572 pages.

International Search Report dated Sep. 29, 2015 for related PCT Application No. PCT/EP2015/066380, 2 pages.

Office Action dated May 26, 2017 for related Taiwanese Application No. 104123282, 3 pages.

English translation of Chinese Office Action dated Jan. 3, 2020, for corresponding Chinese Application No. 201580039154.4, 12 pages.

Written Opinion dated May 25, 2020 for corresponding Brazilian Application No. BR112017000637 (with English translation, 6 pages).

* cited by examiner

WIND-TURBINE ROTOR BLADE, TRAILING EDGE FOR WIND-TURBINE ROTOR BLADE TIP, METHOD FOR PRODUCING A WIND-TURBINE ROTOR BLADE, AND WIND TURBINE

BACKGROUND

Technical Field

The invention relates to a method for producing a wind turbine rotor blade. The invention also relates to a trailing edge for a rotor blade tip and the invention relates to a wind turbine rotor blade.

Description of the Related Art

Wind turbines are generally known and FIG. 1 shows such a known wind turbine. The design of the rotor blade or rotor blades is an important aspect for the efficiency of the wind turbine. The form of the rotor blade tip is also an important factor here. When a flow passes around the rotor blade tip, a difference in pressure between the upper side and the underside causes free edge turbulences, resulting in a resistance. Moreover, disturbing noises are produced by these free edge turbulences.

To reduce these disturbing noises, so-called winglets are already known. A winglet should be understood as meaning an attachment to the ends of a rotor blade that deviates from the longitudinal axis of the rotor blade by a predetermined angle. The resistance and the formation of turbulence at the rotor blade tip can be reduced by such winglets. As a result, turbulences occurring at the ends of the rotor blades, that is to say at the rotor blade tip, are reduced. The noises produced as a result are consequently likewise reduced. The power output of the wind turbine can be increased. A disadvantage of such known winglets is that they are difficult to design to achieve a desired reduction in noise or increase in power output. There is the risk that it causes a disproportionate effort in relation to the effect.

In the priority-establishing German patent application, the German Patent and Trademark Office searched the following documents: DE 10 2008 037 368 A1, DE 10 2011 050 661 A1, US 2003/0175121 A1, U.S. Pat. No. 5,088,665 A, EP 1 314 885 B1, EP 0 652 367 A1 and WO 2014/086919A1.

BRIEF SUMMARY

One or more embodiments are directed to a solution that increases the effectiveness of a rotor blade of a wind turbine without further increasing noise effects.

According to one embodiment, a wind turbine rotor blade with a leading edge, a trailing edge, a rotor blade root, a rotor blade tip, a suction side, a pressure side, a rotor blade length, a profile depth and a pitch axis of rotation. The rotor blade tip is designed as a winglet and is angled away or bent away towards the pressure side. The rotor blade tip has a rotor blade tip trailing edge, which in turn has a trailing edge delimiting line, which replicates the contour of the rotor blade tip trailing edge. The rotor blade tip trailing edge has a plurality of serrations to improve flow behavior at the rotor blade tip trailing edge. The serrations respectively have a serration tip, two serration edges and an angle bisector. The serration edges are provided non-parallel to a direction of incident flow, which is perpendicular to the pitch axis of rotation. The serration edges are non-perpendicular to a tangent to the trailing edge delimiting line. The trailing edge delimiting line has a plurality of portions, one of the portions extending non-parallel to the pitch axis of rotation.

According to one aspect of the present invention, a length of the two serration edges of a serration is unequal, the angle bisector of a serration is non-perpendicular to the pitch axis of rotation and/or an angle of an angle bisector with respect to a tangent to the trailing edge delimiting line is between 70 and 110 degrees.

To achieve the object, a trailing edge for a rotor blade tip of an aerodynamic rotor of a wind turbine is proposed. The trailing edge comprises a trailing edge delimiting line, which replicates the contour of the trailing edge, and multiple serrations to improve flow behavior at the trailing edge. The serrations are provided at the trailing edge in dependence on the trailing edge delimiting line.

The rotor blade tip has over its entire length, that is to say from the connection point to the rotor blade to the tip itself, a trailing edge with a trailing edge delimiting line. The trailing edge delimiting line in this case replicates the contour of the trailing edge, that is to say the line in which the suction side and the pressure side of the rotor blade tip converge. In particular, such a trailing edge delimiting line is a curved line. The multiple serrations are arranged next to one another at the trailing edge delimiting line. The serrations are in this case provided or aligned in dependence on the trailing edge delimiting line. That is to say that the design of the serrations at the trailing edge is dependent on the trailing edge delimiting line, and consequently on the contour or the geometry of the trailing edge. Accordingly, curvatures and the like are taken into account in the alignment of the serrations at the trailing edge. This has the advantage that the serrations are optimally adapted to the trailing edge delimitation, and consequently turbulences occurring can be reduced. As a result, the noise emission and a drop in power output are likewise reduced.

The profiles or the geometries of the rotor blade tips, and thus also the trailing edge delimiting line of rotor blade tips of various types of wind turbine, are differently designed. In particular, such rotor blade tips are designed as so-called winglets to reduce noise emissions. The design is at the same time dependent on the different sites, at which different wind conditions such as strong wind or light wind may prevail. In this case, the definition of the serrations is dependent on the geometrical and operating parameters of the rotor blade tip or the wind turbine, and consequently on the trailing edge delimiting line at the rotor blade tip. The arrangement of the serrations dependent on the trailing edge delimiting line allows the serrations to be adapted individually to the respective profile of the rotor blade tip. The noise emission can consequently be optimally reduced and the power output of the wind turbine can be increased.

The rotor blade tip is preferably configured as a winglet. The winglet is in this case a bent blade tip, that is to say part of a rotor blade that deviates from the longitudinal axis of the rotor blade at a predetermined angle. The winglet is in this case configured either in the direction of the incident flow or counter to the direction of the incident flow. The rotor blade tip may also be configured as two winglets, which point in opposite directions. Such a winglet reduces the turbulences produced due to the difference in pressure between the upper side and the underside or the suction side and the pressure side, in that they break up the edge turbulence and divert it outwards. As a result, the noise emission is reduced and the power take-up is increased. In combination with a serrated trailing edge, that is to say a trailing edge with multiple serrations, these effects can be significantly increased.

In a preferred embodiment, the serrations are arranged normal to the trailing edge delimiting line. In this case, the individual serrations respectively have a serration height. The maximum serration height is located here on a normal to the trailing edge delimiting line. Such serrations can intercept turbulences of various magnitudes occurring at the trailing edge, and thereby reduce the noise emission. In the case of a curved trailing edge delimiting line, the serrations are correspondingly aligned unequally. They consequently point in different directions.

In a particularly preferred embodiment, each serration has at least two serration edges and the trailing edge has a serration trailing edge delimiting angle, which is defined by a serration edge and the direction of incident flow, provided normal to the trailing edge delimiting line. The serration trailing edge delimiting angle is less than 90°, preferably less than 60°, in particular less than 45°. The values mentioned achieve an optimum flow behavior at the trailing edge. It is a theoretical assumption that the serration trailing edge delimiting angle is normal to the trailing edge delimiting line. In reality, such a serration trailing edge delimiting angle may well also be greater as result of a change in the incident flow, which leads to a flow behavior at the trailing edge that is not optimum. However, the alignment of the serrations with a serration trailing edge delimiting angle of less than 90°, in particular less than 45°, makes it possible to compensate for such changes in the direction of incident flow, so that they scarcely have any influence on the development of noise and/or the power output of the wind turbine.

In a preferred embodiment, the serration trailing edge delimiting angle is variable along a length of the rotor blade tip, the length being defined as the length from the connection to the rotor blade to the actual tip. That is to say that the angle between a serration edge and the direction of incident flow that is provided normal to the trailing edge delimiting line is not restricted to just one value. Rather, different values for the serration trailing edge delimiting angle may be obtained for example in the region of the connection to the rotor blade than in the region of the rotor blade tip. In this way, an optimum flow behavior can be achieved.

In a preferred embodiment, the rotor blade tip or the entire rotor blade has a pitch axis and the serrations are arranged normal to the pitch axis. The pitch axis of the rotor blade is to be understood here as meaning the axis about which the angle of attack, that is to say the pitch, of the rotor blades is adjusted. The angle of attack or pitch angle is adjusted in order to regulate the power output of the wind turbine and, with changing wind speeds, to achieve in each case an optimum efficiency of the wind turbine. The rotor blade tip is in this case likewise adjusted about such a pitch axis. It is assumed in theory that the incident flow acts normal to this pitch axis or axis of attack. An alignment of the serrations in a way corresponding to the pitch axis brings about a reduction in the turbulences, and consequently a reduction in noise.

Preferably, the trailing edge has a serration pitch angle which is defined by a tangent at a predetermined position on the trailing edge delimiting line. The trailing edge delimiting line has various points for each position along the length of the rotor blade tip. The placing of a tangent at the respective point produces many different tangents, and consequently different serration pitch angles, along the length of the rotor blade tip. The angle between the pitch axis and the respective tangent defines the serration pitch angle. This is consequently likewise calculated in dependence on the trailing edge delimiting line. The adaptation to the trailing edge delimiting line allows turbulences occurring to be reduced, whereby the noise emission can also be reduced.

Preferably, the multiple serrations and/or serration edges along a or the length of the rotor blade tip are arranged asymmetrically at the trailing edge. The fact that the trailing edge delimiting line may have a curved form and the serrations are aligned dependently on the trailing edge delimiting line means that the serrations are aligned differently at different positions along the rotor blade length, and consequently not symmetrically, that is to say that the individual serration edges do not have the same angle to the trailing edge delimiting line or incident flow. In particular, the two serration edges of a serration may in this case have different angles in relation to the incident flow. As a result, turbulences of different magnitudes and kinds can be reduced.

In a particularly preferred embodiment, the trailing edge delimiting line is at least partially curved over the length of the rotor blade tip, that is to say is not straight. Since aerodynamic profiles—such as the profiles of a rotor blade tip—have a very complex geometry to achieve the optimum power output, it is sometimes necessary that the trailing edge delimiting line is not straight at some points along the length of the rotor blade tip, therefore extends in a curved manner. Such a curvature is taken into account by the fact that the serrations are adapted to the trailing edge delimiting line, or are calculated dependently on it. The rotor blade tip can in this way be designed with respect to its profile and the optimum arrangement of the serrations at the trailing edge or the geometry of the serrations.

Preferably, the rotor blade has a region where it is connected to the rotor blade and a tip region, the serration trailing edge delimiting angle increasing from the connecting region to the tip region in the case of the serration edges that point towards the connecting region and/or decreasing from the connecting region to the tip region in the case of the serrations that point away from the connecting region. That is to say that the serration trailing edge delimiting angle on the one hand decreases on the side of the serrations that point in the direction of the tip region and on the other hand increases on the side of the serrations that are facing the connecting region. The tip region is understood in the present case as meaning the region of the rotor blade tip that is opposite from the connecting region.

Since on account of the different incident flow conditions, such as the Reynolds number, the Mach number, the angle of attack, etc., that occur at the rotor blade root and the rotor blade tip, turbulences of various magnitudes are produced near the trailing edge. Large serration trailing edge delimiting angles are effective for example for great turbulences and small serration trailing edge delimiting angles are effective for small turbulences. The arrangement consequently allows small and great turbulences to be covered. Moreover, in the case of moderate turbulences, such an arrangement has at least averagely good effectiveness.

Also proposed for achieving the object is a rotor blade tip for a rotor blade for a wind turbine, the rotor blade tip having at least one trailing edge according to one of the preceding embodiments. The relationships, explanations and advantages according to at least one embodiment of the trailing edge described are consequently obtained.

Such a rotor blade tip is in this case in particular a rotor blade of an upwind rotor with active blade adjustment. The rotor blade tip can in this case be used for wind turbines of all power output classes, particularly in power output classes in a megawatt range.

Furthermore, a wind turbine with at least one rotor blade with a rotor blade tip, preferably with three rotor blades each with a rotor blade tip, is proposed.

Furthermore, a method for calculating a serration geometry on a trailing edge of a rotor blade tip of a rotor blade of an aerodynamic rotor of a wind turbine is proposed. In this case, the trailing edge has a trailing edge delimiting line, which replicates the contour of the trailing edge, and the serration geometry is calculated in dependence on the trailing edge delimiting line. Each serration has in this case a serration height, serration width and at least two serration edges. The serration edges in this case extend from the serration width to the serration tip. They may touch at the serration tip or alternatively the serration tip may also be round or be configured with a further edge. The serration geometry is defined by the present method in particular by way of the arrangement of the serration edges in relation to the trailing edge delimiting line.

The relationships, explanations and advantages according to at least one embodiment of the trailing edge described are consequently obtained.

Preferably, in the case of the method
the local incident flow is assumed to be normal to the trailing edge delimitation and/or
a delimiting angle that is defined by the incident flow and a serration edge is calculated,
the serration trailing edge delimiting angle being less than 90°, preferably less than 60°, in particular less than 45°.

In a preferred embodiment, in the case of a method
the direction of incident flow is assumed to be normal to the pitch axis of the rotor blade and/or
multiple serrations are aligned normal to the pitch axis, a serration pitch angle which, between the pitch axis and the serration edge, corresponds to the angle of a tangent at a position of the trailing edge being calculated.

The trailing edge delimiting line has various points for each position along the length of the rotor blade tip. The placing of a tangent at the respective point produces many different tangents, and consequently different serration pitch angles, along the length of the rotor blade tip. The angle between the pitch axis and the respective tangent defines the serration pitch angle. This is consequently likewise calculated in dependence on the trailing edge delimiting line. The adaptation to the trailing edge delimiting line allows turbulences occurring to be reduced, whereby the noise emission can also be reduced.

In a preferred embodiment, the method for calculating the serration geometry for a trailing edge according to at least one of the embodiments described above is used.

The calculations are in this case based on the following considerations.

The Strouhal number is very much smaller than 1. The Strouhal number is in this case a dimensionless characteristic of aerodynamics with which the separation frequency of turbulences when there is an unsteady flow can be described. One of the factors influencing the Strouhal number is the serration height. The following relationship is obtained here for the serration height:

$$H\left(\frac{r}{R}\right) = 2h = c2 \cdot \Lambda_{p3}\left(\frac{r}{R}\right)$$

where C2 has a value of 2 to 15 and is a constant. The serration height is consequently calculated from the coherence length scale $\Lambda_{p3}$, of the turbulent pressure fluctuation by using a constant factor c2. The factor c2 may be determined empirically, or from test measurements or from values obtained from experience.

Where $$H\left(\frac{r}{R}\right)$$

is the serration height at a point r along the rotor blade R. Where r is the point along the blade where the serration height is to be determined. R is the length of the rotor blade.

The ratio of the serration height to the serration width becomes $$\frac{H}{\lambda} > 0.5,$$

where $\lambda = H/c3$ and $c3 = 0.5$ to 6 is an empirical constant.

The angle between the direction of local incident flow and the serration edge, that is to say the serration trailing edge delimiting angle, is $\Phi_i < 90°$. It is presupposed here that the incident flow is normal to the pitch axis of the rotor blade, in the present case therefore $\Phi_i = \Phi \pm \theta_i$. Where $\theta_i$ is the serration pitch angle. In this case, the serration pitch angle $\theta_i$ varies along the rotor blade length, dependent on the trailing edge delimitation.

BRIEF DESCRIPTION OF THE SEVERAL VIEWS OF THE DRAWINGS

The invention is explained in more detail below by way of example on the basis of exemplary embodiments with reference to the accompanying figures.

DETAILED DESCRIPTION

It should be noted that the same designations may possibly denote elements that are similar but not identical and may also be of different embodiments.

The explanation of the invention on the basis of examples with reference to the figures is substantially schematic, and, for the sake of better illustration, the elements that are explained in the respective figure may be exaggerated in it and other elements simplified. Thus, for example, FIG. 1 schematically illustrates a wind turbine as such, and so the intended serrated trailing edge on the rotor blade tip and the winglet form of the rotor blade tip cannot be clearly seen.

Figure 1:
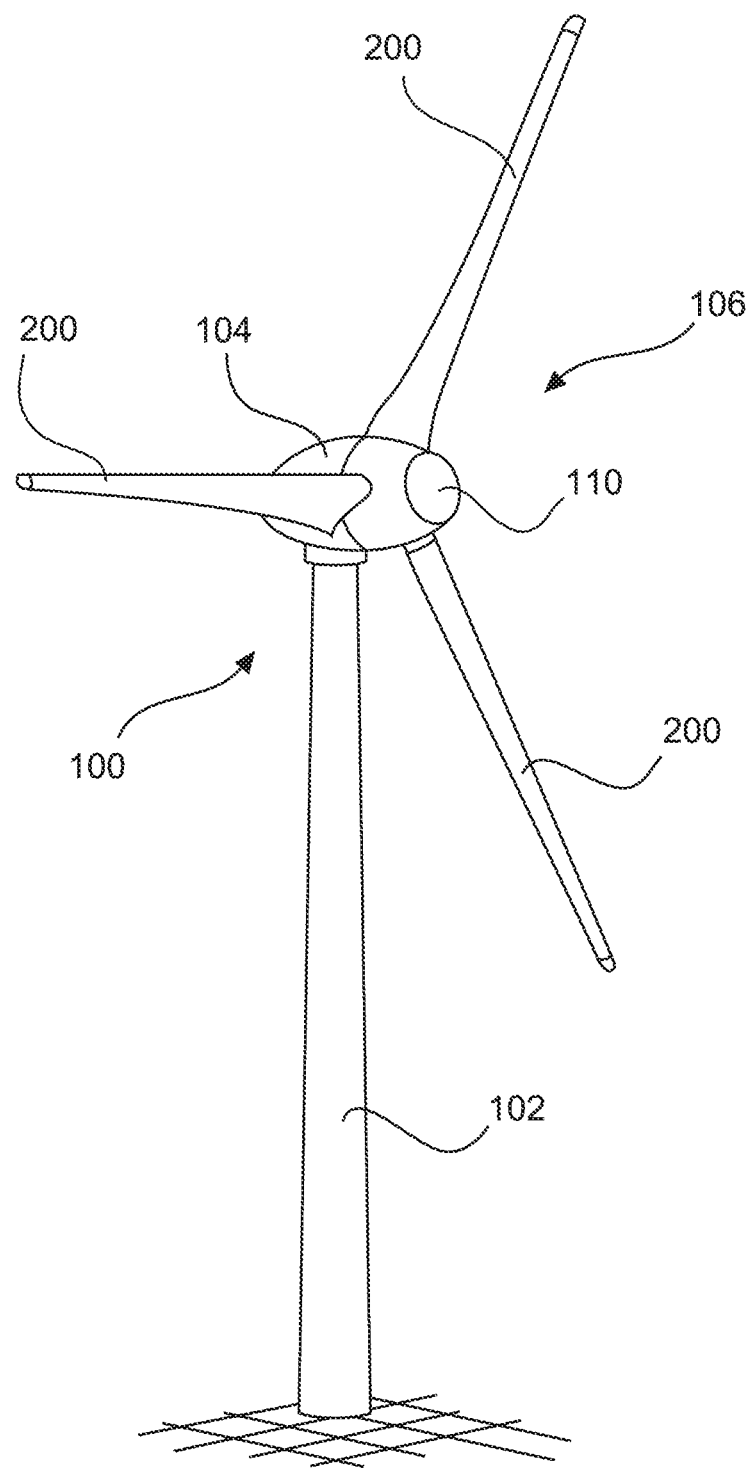
FIG. 1 schematically shows a wind turbine in a perspective view.

FIG. 1 shows a wind turbine 100 with a tower 102 and a nacelle 104. Arranged on the nacelle 104 is a rotor 106 with three rotor blades 200 and a spinner 110. During operation, the rotor 106 is set in a rotational movement by the wind and thereby drives a generator in the nacelle 104. The pitch of the rotor blade can be set for example in each case by a pitch drive.

Figure 2:
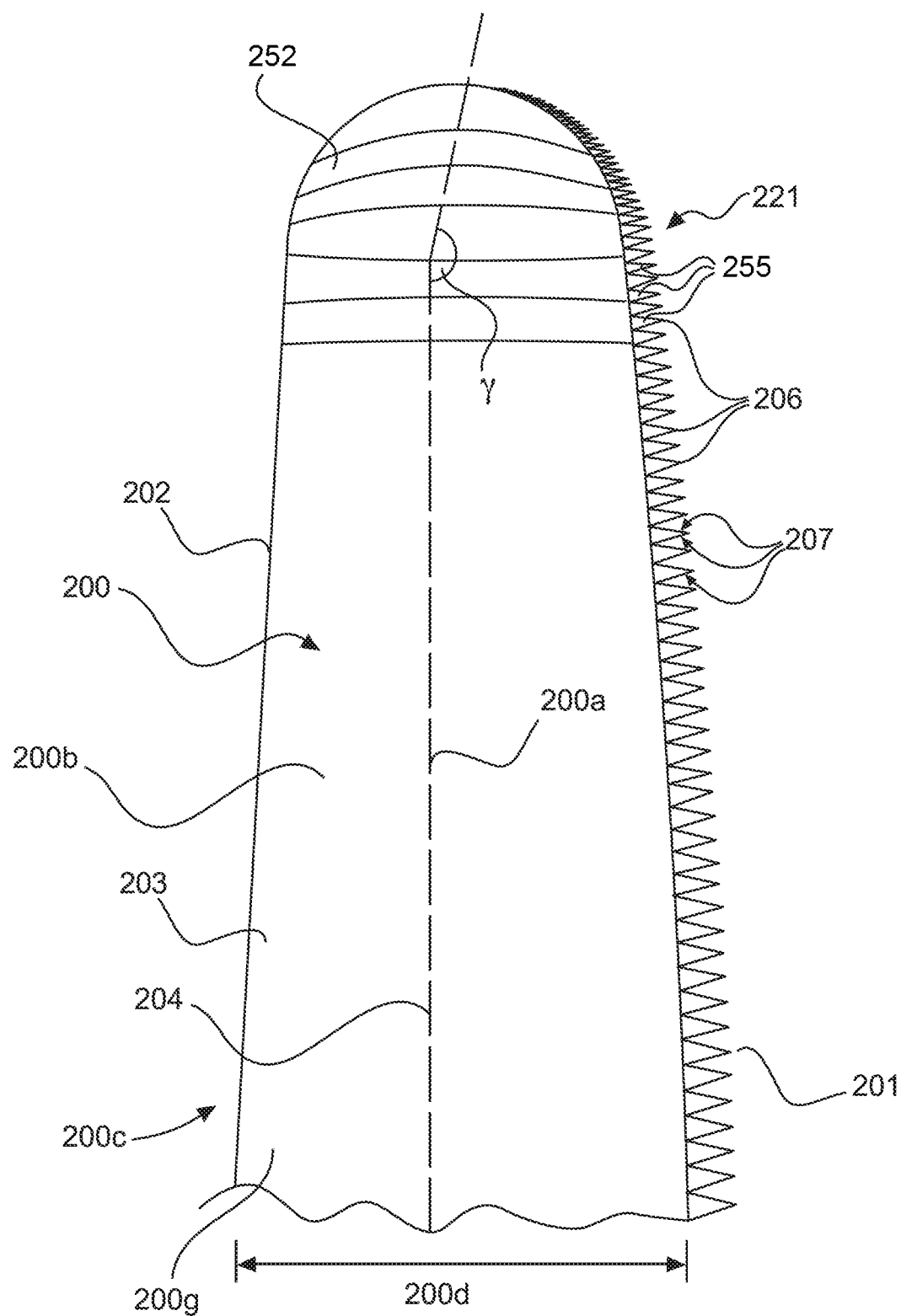
FIG. 2 schematically shows a rotor blade portion with a rotor blade tip with a trailing edge with a serrated delimitation according to a first exemplary embodiment.

FIG. 2 schematically shows a detail of a rotor blade portion 203 with a rotor blade tip 252 with a rotor blade trailing edge 221, which for simplicity is also referred to as the trailing edge. Rotor blade tip 252 leads from a rotor blade portion 203 in a direction deviating from the longitudinal axis 204 at an angle γ with respect to the longitudinal axis 204 of the rotor blade portion 203 or a pitch axis of rotation. The rotor blade 200 has a pitch axis of rotation 200a. The pitch axis of rotation 200a is the axis of rotation of the rotor blade when the pitch of the rotor blade is adjusted. The rotor blade 200 has a suction side 200b, a pressure side 200c, a leading edge 202 and a trailing edge 201. The rotor blade 200 has a profile depth 200d, which may decrease along the length of the rotor blade (towards the rotor blade tip).

The rotor blade 200 has an outer shell 200g, inter alia with a fiber composite material, such as for example GRP (glass fiber reinforced plastic) or CRP (carbon fiber reinforced plastic). In addition, webs may be provided between the suction side and the pressure side.

The rotor blade tip 252 is consequently a so-called winglet, which is bent or angled away towards the pressure side 200c. Provided on the rotor blade tip 252 is a trailing edge 221, which has a serrated delimitation with multiple serrations 255, which are arranged next to one another along the rotor blade tip 252 and the rotor blade portion 203. Each serration 255 respectively has a serration tip 256 and also two serration edges 257, which touch at the serration tip 256. One side of a serration edge 257 in each case likewise touches a neighboring serration edge 257 and on the opposite side, that is to say in the region of the serration tip 256 again touches the second serration edge 257 belonging to the respective serration 255, etc. It should be noted that the detail shown of the rotor blade tip 252 is only an exemplary embodiment. The serrations 255 may alternatively only be provided in a portion of the rotor blade tip 252 or only at the rotor blade tip 252. Furthermore, it is possible that the serrations 255 also extend further over the trailing edge of the entire rotor blade.

The trailing edge 201 of the rotor blade is not straight (along the length of the rotor blade), but has a plurality of portions that can be aligned differently in relation to the pitch axis of rotation 200a. The rotor blade tip 252 is designed as a winglet and is angled away or bent towards the pressure side 200c.

A trailing edge of the rotor blade tip with a plurality of serrations may be designed as a separate part. In this way a trailing edge portion with a plurality of serrations can also be retrofitted on an existing rotor blade. Furthermore, this trailing edge portion (of the rotor blade tip) may be produced separately, in order to be fastened to the trailing edge during the production of the rotor blade. For this purpose, it may be possible that a portion or segment has to be removed or sawn out or cut out from the trailing edge of the rotor blade already produced.

Figure 3:
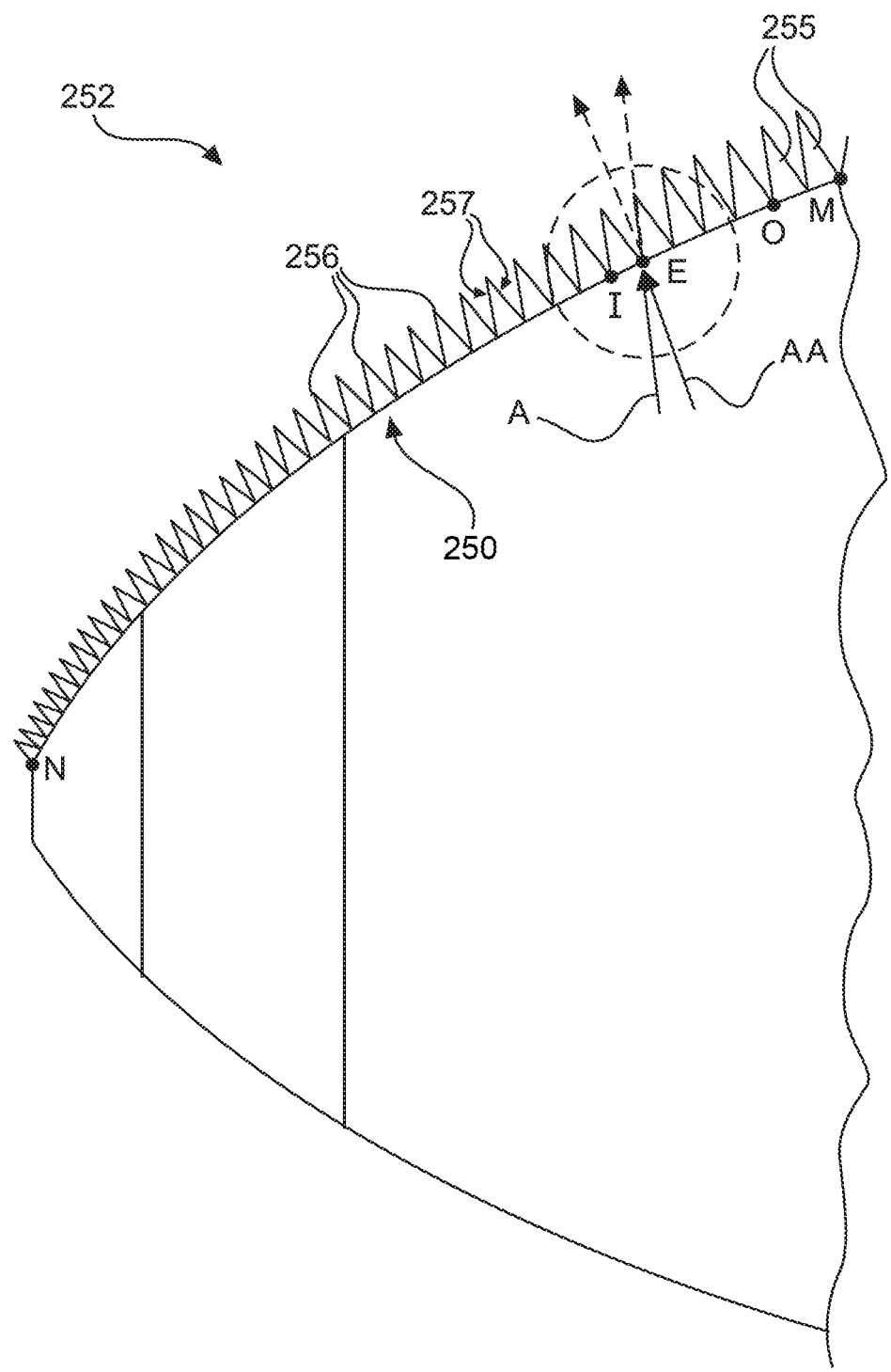
FIG. 3 schematically shows a rotor blade tip with a trailing edge with a serrated delimitation.

FIG. 3 shows a trailing edge delimiting line, which is also referred to hereinafter for simplicity as the trailing edge delimitation 250, of a rotor blade tip 252 as depicted for example in FIG. 2. The curve MOEN characterizes the trailing edge delimitation 250 of the rotor blade tip 252 at various radial positions of the rotor blade, that is to say along the span of the rotor blade. Multiple serrations 255, which respectively have a serration tip 256 and two serration edges 257, can be seen in FIG. 3. The size of the serrations 255 decreases from point M to point N. The serrations 255 are arranged over the entire trailing edge delimitation 250 of the rotor blade tip 252.

In FIG. 3, the direction of the local incident flow AA and A can also be seen. The direction of local incident flow AA and A differs by two different assumptions. In the case of the direction of local incident flow AA, it is assumed that it extends normal to the trailing edge. The direction of local incident flow A is provided normal to the pitch axis of the rotor blade.

Figure 4:
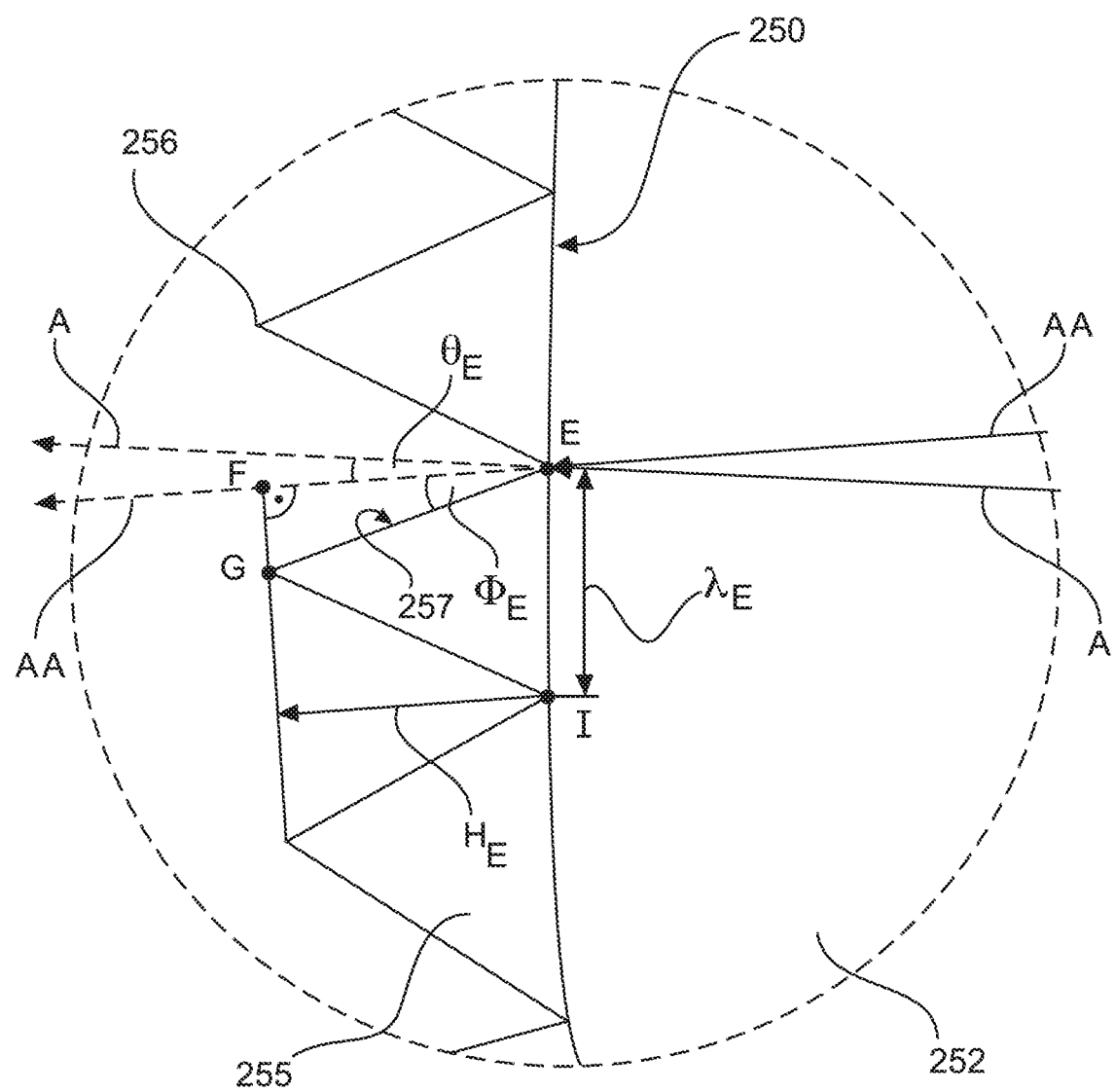
FIG. 4 shows an enlarged detail of the rotor blade tip from FIG. 3.

FIG. 4 shows an enlarged detail of the rotor blade tip 252 from FIG. 3. Arranged along the trailing edge delimitation 250 are multiple serrations 255, which respectively have a serration tip 256 and also respectively have two serration edges 257. Moreover, the serrations 255 have a serration height H and also a serration width λ. At the point E, the serration edge 257 forms together with the direction of local incident flow AA serration trailing edge delimiting angle $\Phi_E$. For a given definition of the serration height $H_E$ and width $\lambda_E$ at the point E, the serration trailing edge delimiting angle $\Phi_E$ can be calculated. It follows from the triangle EFG in FIG. 4 that:

$$\tan(\Phi_E) = \frac{\lambda_E/2}{H_E} = \frac{\lambda_E}{2H_E}$$

and with $$\frac{H_E}{\lambda_E} = 2$$

it follows that $$\tan(\Phi_E) = \frac{\lambda_E}{2H_E} = \frac{1}{4}.$$

From this it follows that $\Phi_E = 14.03°$

So if the ratio $H_E/\lambda_E = 2$ remains constant along the entire length of the rotor blade tip, then $\Phi_E = 14.03$ likewise remains constant. It has been found that the maximum noise reduction can be achieved when the angle between the main direction of incident flow and the serration edge (or line EG in FIG. 4) is less than 90°, in particular less than 45°. Consequently, the serration trailing edge delimiting angle $\Phi_E$ calculated for FIG. 3 lies in the stated range. It is likewise possible to vary the serration trailing edge delimiting angle $\Phi$, for example by variation of the ratio of H/λ or the direction of incident flow. With the variation of H/λ=[0.5, 1, 2, 4, 6, 8] and the assumption that the direction of incident flow is constant, the following values would be obtained for $\Phi$: 45; 26.56; 14.03; 7.12; 4.76; 3.57 degrees. This presupposes that the direction of incident flow remains unchanged. However, the direction of local flow varies during the operation of the wind turbine.

Figure 5:
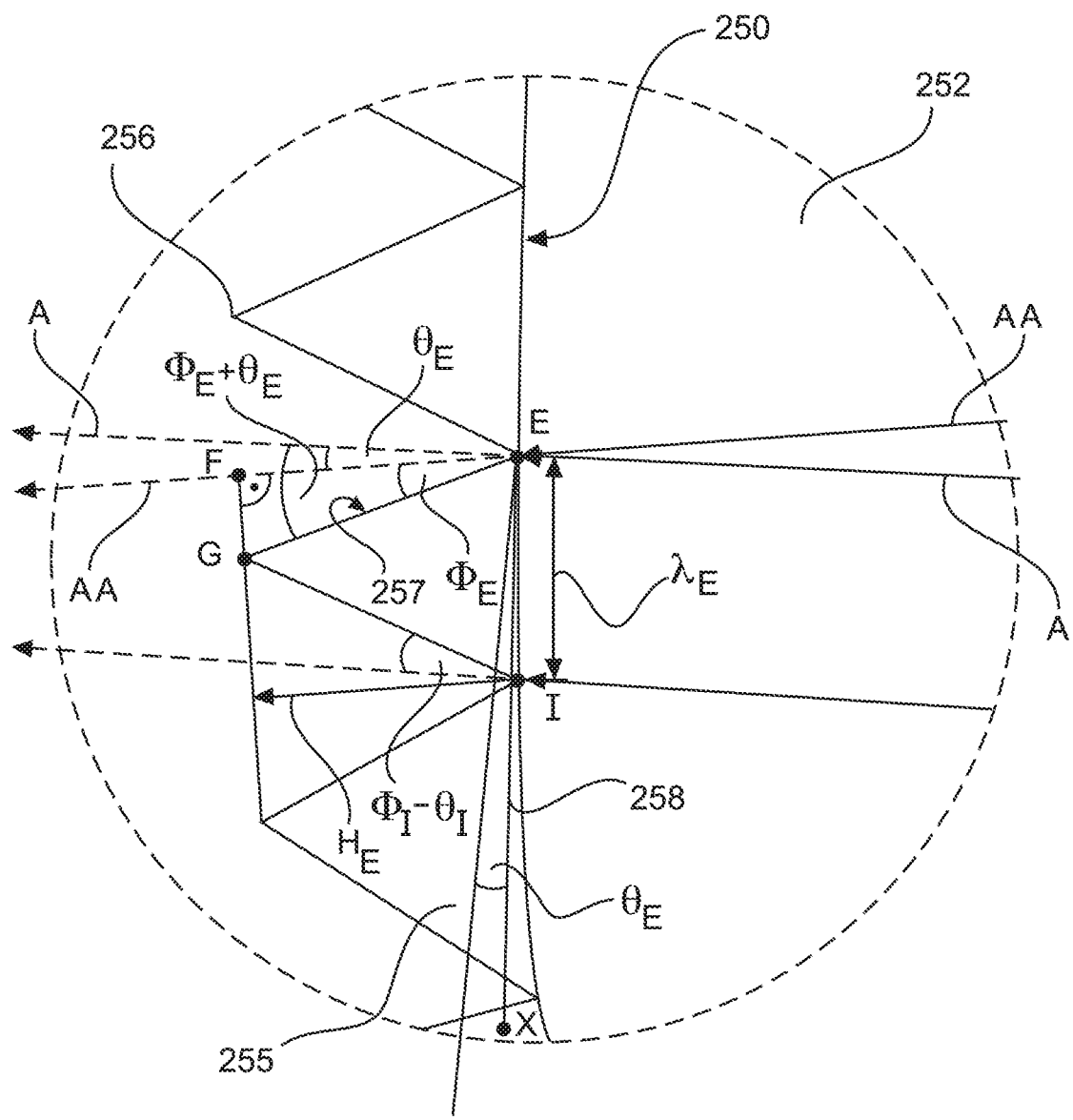
FIG. 5 shows a further enlarged detail of the rotor blade tip from FIG. 3.

Therefore, a relationship is established between the line A'E and AE. This allows a distribution of non-symmetrical serration geometries in which the serration trailing edge delimiting angle Φ varies along the span of the rotor blade tip. FIG. 5 shows an enlarged detail of the rotor blade tip 252 with the trailing edge delimitation 250 from FIG. 4.

In addition to FIG. 4, FIG. 5 shows a tangent 258 passing through the point E. The serrations 255 are aligned normal to the trailing edge. The normal to the trailing edge produces a serration pitch angle $\theta_E$ with the direction of incident flow normal to the pitch axis. The serration pitch angle $\theta_E$ is determined by way of the tangent at the point E (line XE 58). If the tangent 258 at each position of the trailing edge 250 is different, the serration pitch angle $\theta_E$ varies from the beginning of the rotor blade tip 252 to the end of the rotor blade tip 252 or from the rotor blade root to the rotor blade tip, depending on the respective trailing edge delimitation. It can be seen from FIG. 5, in particular at the positions E and I, that the angle between the direction of local incident flow and the serration edges 257 is calculated from $\Phi_E+\theta_E$ and $\Phi_I-\theta_I$, respectively. The serration edges 257 are not symmetrical over the line for the direction of incident flow AE, because the angle $\Phi+\theta_E$ is not identical to the angle $\Phi-\theta_I$. This indicates that the angle of local incident flow between the direction of incident flow and the serration edge 257 at the point E and at the point I is not identical. This only applies if the direction of local incident flow is normal to the pitch axis 200a, as in FIG. 4.

Figure 6:
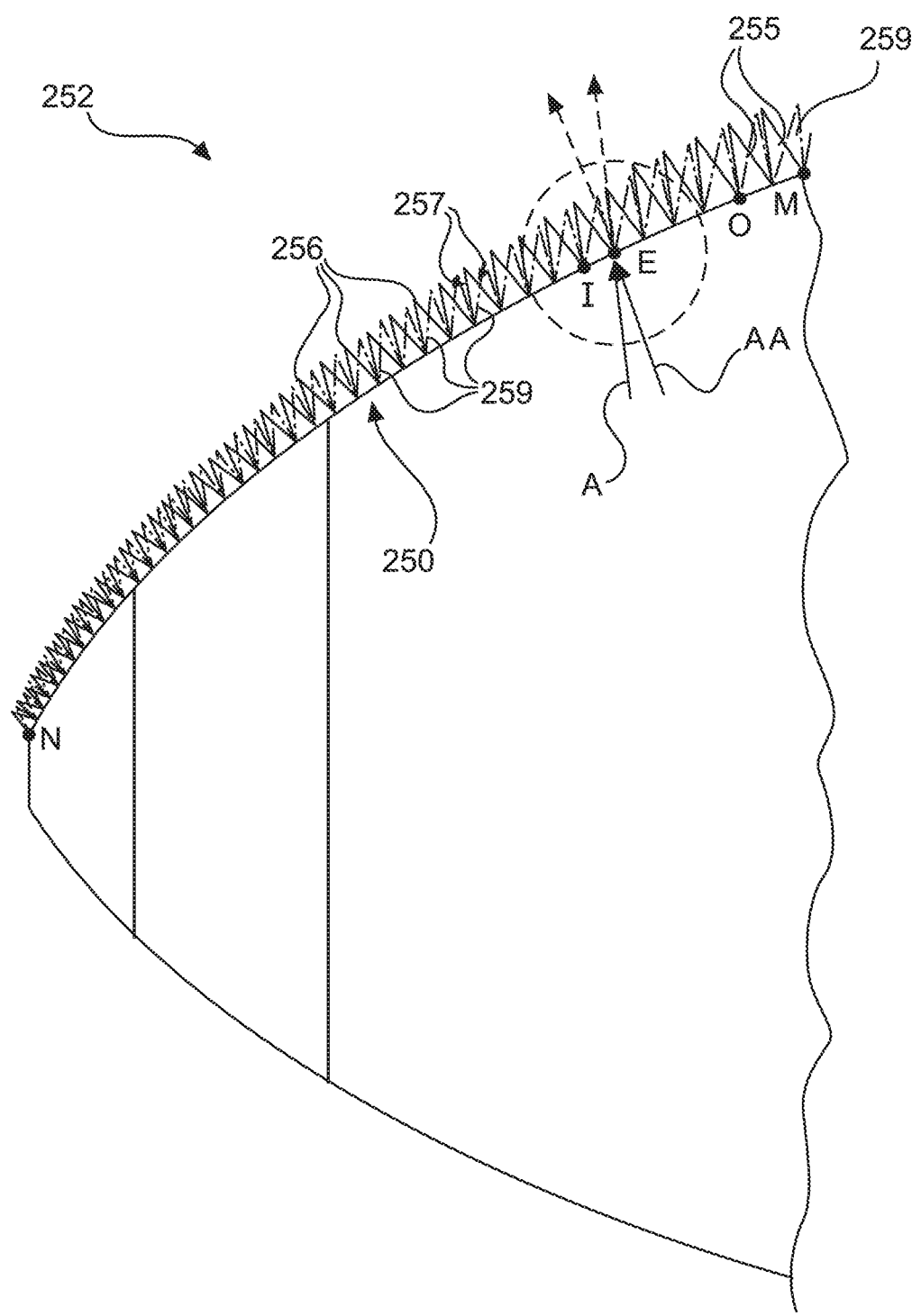
FIG. 6 schematically shows a rotor blade tip with two different serration geometries at the trailing edge.

However, the exact direction of local incident flow is always unknown. It can at best be approximated by an assumption. It is therefore likewise possible to change the serration geometry in such a way that an optimum Φ and H/λ is achieved. FIG. 6 schematically shows in this respect a detail of a rotor blade tip 252 with two different serration geometries. The first geometry, to be specific the serrations 255, is/are aligned normal to the trailing edge of the rotor blade tip 252. The second geometry, to be specific the serrations 259, is/are aligned normal to the pitch axis of the rotor blade. The serrations 259 are depicted here as a dash-dotted line. For this case, the angle between the direction of incident flow and the serration edge at point E and I is $\theta_E$ and $\theta_I$, respectively. The serration geometry is carried out by way of a coordinate transformation of the serration data from the serrations that are arranged normal to the trailing edge. This can be seen schematically in the enlarged detail of the rotor blade tip 252 in FIG. 7.

Noise field measurements were carried out for three rotor blade configurations: 1. for a rotor blade without serrations, 2. for a rotor blade with serrations that are aligned normal to the rotor blade trailing edge and 3. for a rotor blade with serrations that are aligned normal to the pitch axis. The data have shown that the respective rotor blades with the serrations at the rotor blade tip were less noisy than the rotor blades without serrations at the rotor blade tip. Moreover, the alignment of the serrations dependent on the trailing edge delimitation of the rotor blade tip is particularly preferred. This arrangement achieves particularly good noise reductions, for example with an increase, in particular in radial position i=1, 3, 5 . . . N−1, and a decrease, in particular in radial position i=2, 4, 6, . . . N, of the serration trailing edge delimitation $\Phi_i$ along the span. This therefore has the result that, on account of different local incident flow conditions such as different Reynold numbers, Mach numbers and angles of attack at the various positions of the rotor blade tip, turbulences of different magnitudes are produced near the trailing edge, i.e., for larger turbulences, serrations with a $\Phi_i$, such as for example at point E i=17, are more effective than smaller angles. For smaller turbulences, serrations with a Small $\Phi_i$ for example at point I, i=18, are more effective than serrations with a large angle. On the other hand, both serration geometries are effective for moderate turbulences.

For optimum results, the following conditions should also be satisfied:

I. The Strouhal number $\omega h/U_c \gg 1$, where $$H\left(\frac{r}{R}\right) = 2h = c2 \cdot \Lambda_{p3}\left(\frac{r}{R}\right),$$

and c2=2 to 15 is a constant,

II. Length to width ratio $$\frac{H}{\lambda} > 0.5,$$

where $\lambda=H/c3$, and c3=0.5 to 6 is an empirical constant,

III. The serration trailing edge delimiting angle between the direction of local incident flow and the serration edge $\Phi_i<90°$, where it is assumed that the incident flow is normal to the pitch axis of the rotor blade, in the present case therefore $\Phi_i=\Phi\pm\theta_i$ according to FIG. 5. In this case, the serration pitch angle $\theta_i$ varies along the span, dependent on the trailing edge delimitation.

Where $$H\left(\frac{r}{R}\right)$$

is the serration height at a point r along the rotor blade R. Where r is the point along the blade where the serration height is to be determined. R is the length of the rotor blade.

Figure 7:
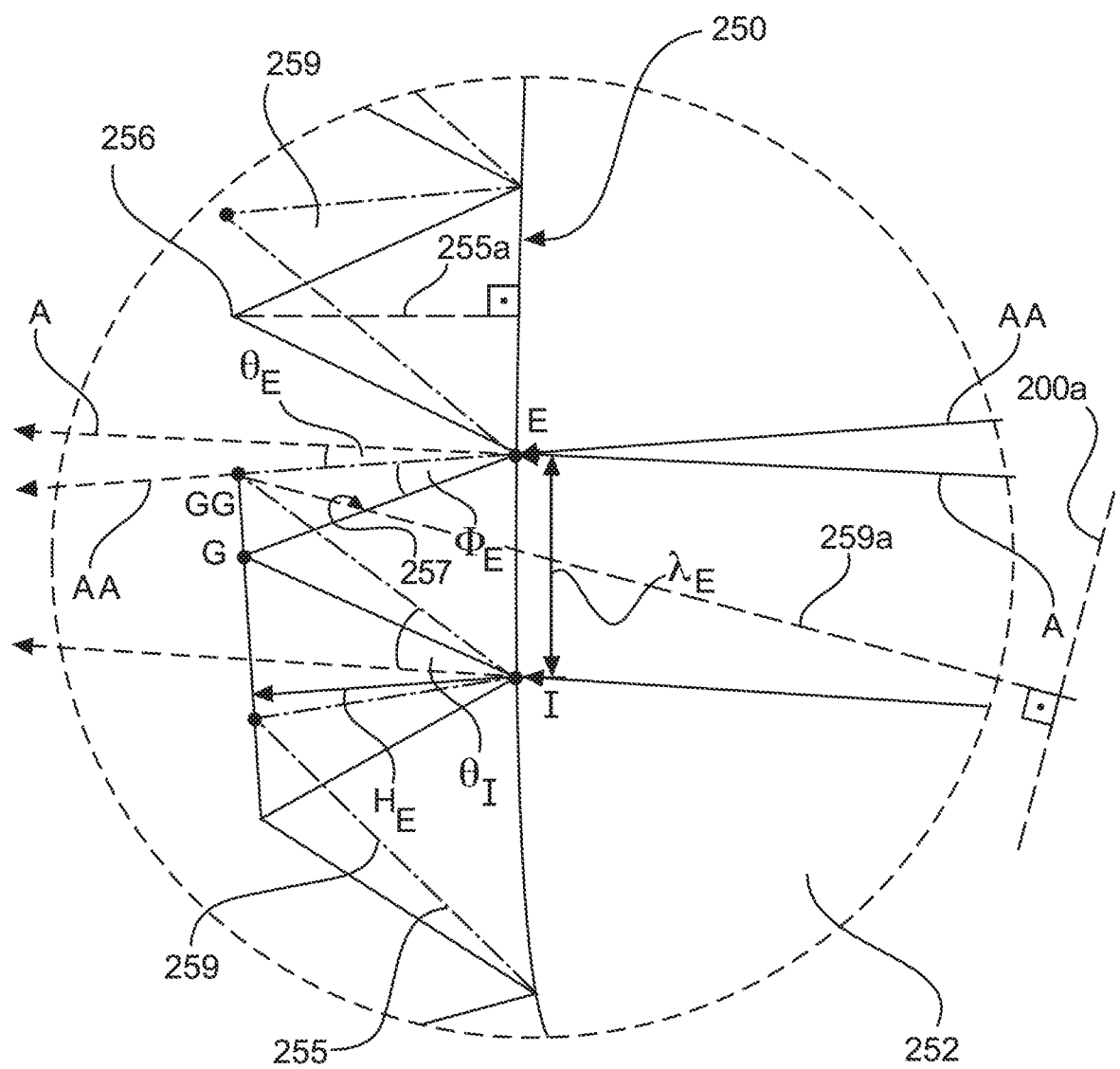
FIG. 7 shows an enlarged detail of the rotor blade tip from FIG. 6.

FIG. 7 shows an enlarged detail 252 of the rotor blade 200 and in particular a detail or portion at the rotor blade tip. The serration geometry is carried out by way of a coordinate transformation of the serration data from the serrations that are arranged normal to the trailing edge.

In FIG. 7, consequently, on the one hand the serrations 255 with the serration tips 256 and the serration edges 257 are shown. An angle bisector 255a of one serration 255 is shown. The angle bisector is perpendicular to the trailing edge delimiting line 250. Another angle bisector 259a of a serration 259 is perpendicular to the pitch axis of rotation or the pitch axis 200a.

Figure 8:
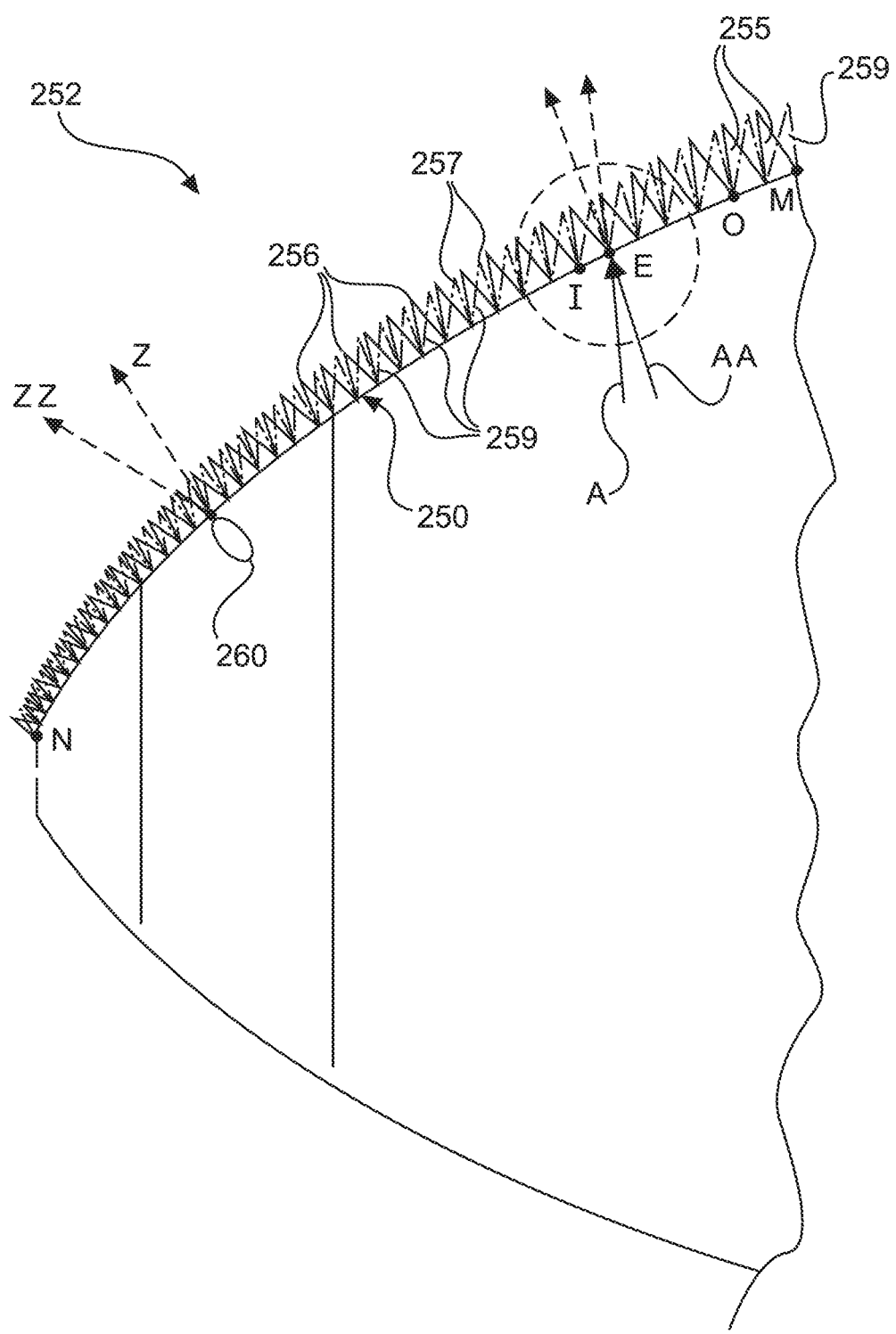
FIG. 8 schematically shows a rotor blade tip.

FIG. 8 shows in addition to FIG. 6 a turbulence 260 that is approaching the trailing edge. According to the theoretical assumptions, the turbulence 260 would continue to move in direction Z. In reality, the turbulence 260 would however continue to move in direction ZZ. Such a turbulence is in this case an unexpected, unsteady aerodynamic phenomenon that can definitely occur in reality. In such situations, the condition $\Phi_i<90°$ is disturbed. The serrations 255 and 259 represented can however also compensate for such turbulences 260, and thereby also reduce the development of noise at the rotor blade, in particular at the rotor blade tip 252, in the case of such a turbulence 260.

Figure 9:
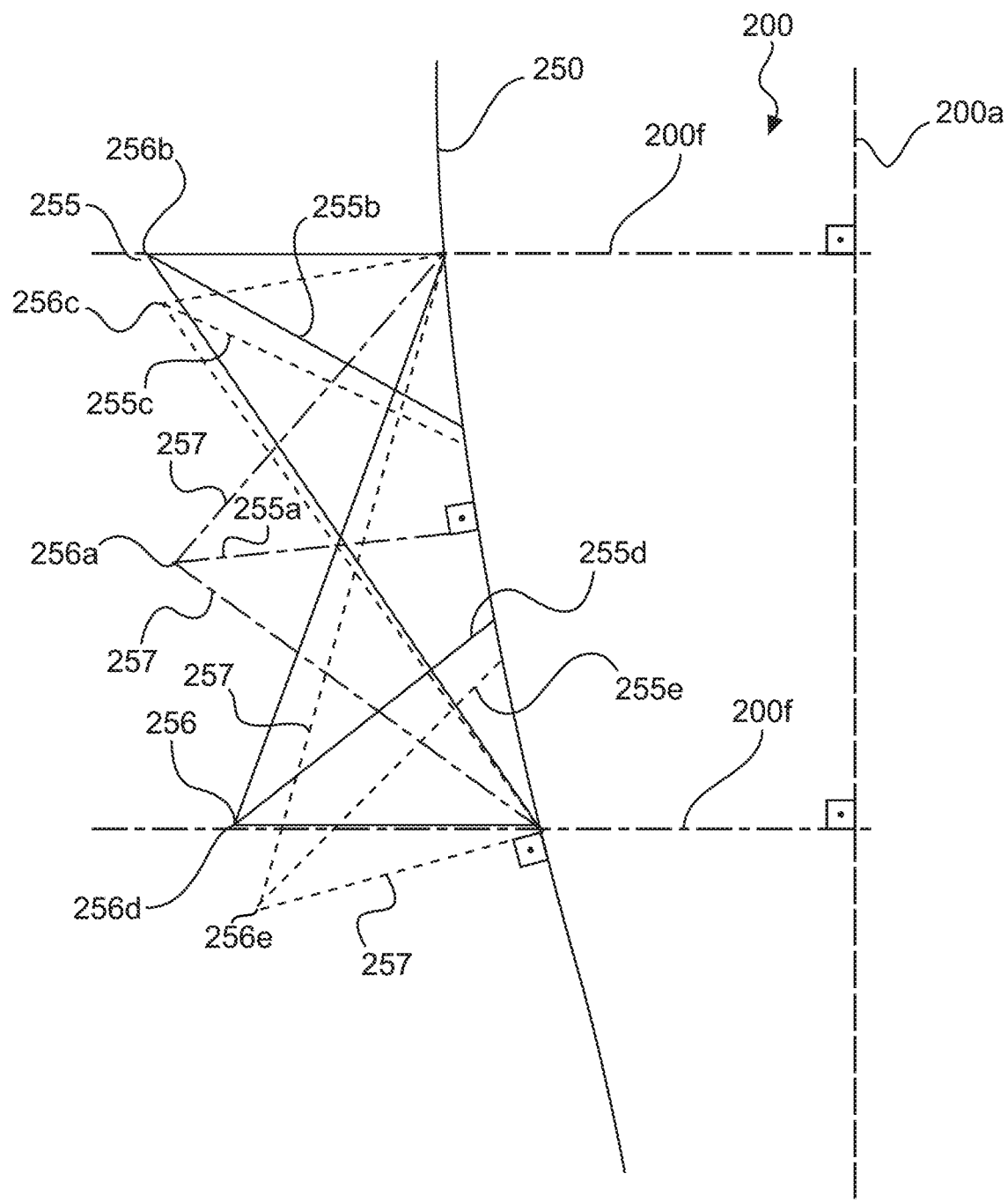
FIG. 9 shows a schematic representation of a detail of a rotor blade according to a second exemplary embodiment of the invention.

FIG. 9 shows a schematic representation of a detail of a rotor blade according to a second exemplary embodiment of the invention. The rotor blade 200 has a pitch axis of rotation 200a and a trailing edge delimitation 250, in particular at the rotor blade tip. Furthermore, the rotor blade 200 has a plurality of serrations 255 at the trailing edge delimitation 250. The serrations 255 respectively have a serration tip 256 and also two serration edges 257 and an angle bisector 255a.

Five different possible serration geometries are shown by way of example in FIG. 9. These serrations 255 respectively have a serration tip 256a, 256b, 256c, 256d, and 256e. Each of the serrations 255 also has an angle bisector 255a, 255b, 255c, 255d, and 255e. Also shown is a direction of incident flow 200f, which is perpendicular to the pitch axis of rotation 200a. The rotor blade 200 according to the second exemplary embodiment may be based on a rotor blade according to the first exemplary embodiment and concerns a rotor blade (with a bent or angled-away rotor blade tip) that has a serration geometry, the angle bisectors 255a-255e being provided for example perpendicularly to a tangent to the trailing edge 250. The serration geometry according to the second exemplary embodiment concerns a range of geometries, the extreme cases being represented by the serrations 255 with the serration tips 256b and 256d, which however are not included in the range of geometries. In the case of these two extreme cases, one of the serration edges 257 is aligned parallel to the direction of incident flow 200f.

The angle bisector 255a may optionally be substantially perpendicular to the trailing edge delimitation 250 of the rotor blade tip; in particular, the angle between the angle bisector of the serrations and the trailing edge delimitation may be between 70 and 110 degrees.

The alignment of the flanks of the serrations is an important parameter. The fact that the trailing edge delimitation of the rotor blade is not straight also has effects on the geometry of the serrations.

The provision of the serrations at the rotor blade trailing edge may lead to the emergent flow vector being aligned differently than the incident flow vector. This may be relevant in particular in the region of the rotor blade tip, because the trailing edge delimitation changes more along the length of the rotor blade in the region of the outer portion or diameter of the rotor blade. On account of centrifugal effects, it may be that the incident flow is no longer two-dimensional but three-dimensional.

The serrations may be designed in such a way that the serration tips are provided off-center.

The serrations may be designed at least in certain portions along the length of the rotor blade in such a way that the serrations are not symmetrical or that the two serration edges 257 do not have the same length.

According to one aspect of the present invention, the angle bisector that extends through the serration tip is perpendicular to a tangent to the trailing edge. Alternatively or in addition to this, the length of the serration edges 257 of a serration may be different, so that the serration is not symmetrically designed.

The invention relates to a wind energy rotor blade with a rotor blade tip that is designed as a winglet and is angled away or bent towards the pressure side. The rotor blade tip has a trailing edge portion, which has a plurality of serrations that respectively have a serration tip, two serration edges and an angle bisector. The trailing edge portion may be produced separately or be produced together with the rest of the rotor blade. The angle bisectors of at least one of the plurality of the serrations are arranged at an angle of between 70 and 110 degrees with respect to a tangent to the trailing edge delimiting line. Preferably, the angle bisector is substantially perpendicular to the tangent to the trailing edge delimiting line.

Optionally, the trailing edge of the rotor blade tip may at least in certain portions be arranged non-parallel to a pitch axis of rotation of the rotor blade.

The invention claimed is:

1. A wind turbine rotor blade, comprising:
a leading edge, a trailing edge, a rotor blade root, a rotor blade tip, a suction side, a pressure side, a rotor blade length, a profile depth, and a pitch axis of rotation,
the rotor blade tip being designed as a winglet,
the rotor blade tip having a rotor blade tip trailing edge,
the rotor blade trailing edge having a trailing edge delimiting line that replicates the contour of the rotor blade tip trailing edge,
the rotor blade tip trailing edge having a plurality of serrations configured to improve flow behavior at the rotor blade tip trailing edge,
the plurality of serrations respectively having a serration tip, two serration edges, and an angle bisector,
the two serration edges for each of the plurality of serrations being non-parallel to an anticipated direction of incident flow, the anticipated direction of incident flow being perpendicular to the pitch axis of rotation,
the two serration edges for each of the plurality of serrations being arranged non-perpendicular to a tangent to the trailing edge delimiting line,
the trailing edge delimiting line having a plurality of portions, at least one of the plurality of portions extending non-parallel to the pitch axis of rotation,
the angle bisector being defined as a line that bisects through a center of the respective serration tip to form two equal parts, wherein the angle bisector, for each of the plurality of serrations, is perpendicular to the tailing edge delimiting line and is non-perpendicular to the pitch axis of rotation.

2. The wind turbine rotor blade according to claim 1, wherein the angle of the angle bisector to the tangent to the trailing edge delimiting line is 90°.

3. The wind turbine rotor blade according to claim 1, wherein:
the trailing edge has a serration trailing edge delimiting angle that is defined by one serration edge of the two serration edges and the anticipated direction of incident flow, wherein the anticipated direction of the incident flow is normal to the trailing edge delimiting line, and
the serration trailing edge delimiting angle is greater than 90°.

4. The wind turbine rotor blade according to claim 3, wherein the serration trailing edge delimiting angle is variable along a length of the rotor blade tip.

5. The wind turbine rotor blade according to claim 3, wherein the rotor blade tip has a connecting region and a tip region, wherein the serration trailing edge delimiting angle either:
increases from the connecting region to the tip region at the respective serration edge of plurality of serration edges that faces towards the connecting region, or
decreases from the connecting region to the tip region at the respective serration edge of the plurality of serrations that faces away from the connecting region.

6. The wind turbine rotor blade according to claim 3, wherein the serration trailing edge delimiting angle is less than 45°.

7. The wind turbine rotor blade according to claim 1, wherein the trailing edge has a serration pitch angle defined at a predetermined position on the trailing edge delimiting line by a tangent.

8. The wind turbine rotor blade according to claim 1, wherein the plurality of serrations are arranged on the trailing edge asymmetrically with each other along a length of the rotor blade tip.

9. The wind turbine rotor blade according to claim 1, wherein the trailing edge delimiting line at least partially extends in a curved manner over a length of the rotor blade tip.

10. The wind turbine rotor blade according to claim 1, wherein improved flow behavior at the rotor blade tip trailing edge is exhibited by a reduction in turbulences at the rotor blade tip trailing edge.

11. A wind turbine comprising:
a rotor hub; and
at least one wind turbine rotor blade according to claim 1 coupled to the rotor hub.

12. A method comprising:
producing a wind turbine rotor blade tip, the rotor blade tip having a trailing edge with a plurality of serrations with a serration geometry,
wherein the trailing edge having a trailing edge delimiting line that replicates a contour of the trailing edge, wherein producing the wind turbine rotor blade tip comprises first designing the wind turbine rotor blade by:
    calculating the serration geometry in dependence on the trailing edge delimiting line, and
    determining a serration pitch angle between a pitch axis and a serration edge that corresponds to an angle of a tangent at a position of the trailing edge,
wherein the plurality of serrations respectively have a serration tip, two serration edges, and an angle bisector,
wherein the two serration edges for each of the plurality of serrations is non-parallel to an anticipated direction of incident flow, the anticipated direction of incident flow being perpendicular to the pitch axis of rotation,
wherein the two serration edges for each of the plurality of serrations is arranged non-perpendicular to a tangent to the trailing edge delimiting line,
wherein the trailing edge delimiting line has a plurality of portions, at least one of the plurality of portions extending non-parallel to the pitch axis of rotation, and
wherein the angle bisector is defined as a line that bisects through a center of the respective serration tip to form two equal parts, for each of the plurality of serrations, is perpendicular to the trailing edge delimiting line and non-perpendicular to the pitch axis of rotation.

13. A wind turbine rotor blade tip comprising:
a rotor blade tip trailing edge, the rotor blade tip trailing edge having a trailing edge delimiting line that replicates a contour of the rotor blade tip trailing edge,
the rotor blade tip trailing edge having a plurality of serrations to improve flow behavior at the rotor blade tip trailing edge,
the plurality of serrations respectively having a serration tip, two serration edges, and an angle bisector,
the two serration edges being provided non-parallel to an anticipated direction of incident flow, wherein the anticipated direction of incident flow is perpendicular to a pitch axis of rotation,
the two serration edges being arranged non-perpendicular to a tangent to the trailing edge delimiting line,
the trailing edge delimiting line having a plurality of portions, at least one of the plurality of portions extending non-parallel to the pitch axis of rotation, and
wherein the angle bisector is defined as a line that bisects through a center of the respective serration tip to form two equal parts, wherein the angle bisector, for each of the plurality of serrations, is non-perpendicular to the pitch axis of rotation and perpendicular to the trailing edge delimiting line.

* * * * *